United States Patent [19]
Dikhoff et al.

[11] 3,763,050
[45] Oct. 2, 1973

[54] METHOD OF RECOVERING A RARE EARTH PHOSPHOR

[75] Inventors: Johannes Aloysius Maria Dikhoff; Franciscus Jacobus de Boer; Dirk Barneveld, all of Emmasingel, Eindhoven, Netherlands

[73] Assignee: U.S. Philips Corporation, New York, N.Y.

[22] Filed: June 11, 1971

[21] Appl. No.: 152,437

[30] Foreign Application Priority Data
June 13, 1970 Netherlands.................... 7008683

[52] U.S. Cl.252/301.4 R, 252/301.4 S, 252/301.6 S, 423/21
[51] Int. Cl. ........ C09k 1/10, C09k 1/14, C09k 1/44
[58] Field of Search ............... 252/301.4 R, 301.4 S, 252/301.6 S; 23/15, 24, 312; 423/21

[56] References Cited
UNITED STATES PATENTS

| | | | |
|---|---|---|---|
| 3,360,674 | 12/1967 | Mikus et al. ............. | 252/301.4 R X |
| 3,368,980 | 12/1968 | Avella et al................. | 252/301.4 R |
| 3,577,351 | 5/1971 | Dodds.......................... | 252/301.4 R |
| 3,625,659 | 12/1971 | Hammond et al. ...... | 252/301.4 R X |
| 3,348,924 | 10/1967 | Levine et al. ............. | 252/301.4 R |
| 3,474,040 | 10/1969 | Hedler et al. ............. | 252/301.4 R |
| 3,523,904 | 8/1970 | Single........................ | 252/301.4 R X |

*Primary Examiner*—Edward J. Meros
*Assistant Examiner*—J. Cooper
*Attorney*—Frank R. Trifari

[57] ABSTRACT

A method of recovering a rare earth phosphor from a mixture which contains this phosphor and at least one sulphide and/or selenide of zinc and/or cadmium. The mixture is treated in an aqueous alkaline solution which contains a hypohalogenite and whose pH is larger than 12. The rare earth phosphor is subsequently separated from the liquid and washed with water, optionally after rinsing with a diluted acid.

5 Claims, No Drawings

METHOD OF RECOVERING A RARE EARTH PHOSPHOR

The invention relates to a method of recovering a rare earth phosphor from a mixture which comprises this phosphor and at least one sulphide and/or selenide of zinc and/or cadmium. Furthermore, the invention relates to a rare earth phosphor obtained by such a method, and to a cathode-ray tube which comprises such a rare earth phosphor.

Cathode-ray tubes for the display of coloured images, particularly coloured television images, generally have a luminescent picture screen which may be excited by electrons originating from one or more electron guns present in the tube. Such a luminescent screen generally has a large number of phosphor groups which are arranged on the surface of the screen in accordance with a certain pattern. Each phosphor group is built up from a number of, for example, three phosphor elements in the form of lines or dots which upon excitation by electrons emit light of a given colour, for example, green, blue and red, respectively.

Different methods are known for the manufacture of these colour screens. In a method which is frequently used the starting material is an aqueous suspension which comprises a certain phosphor to be provided on the screen and a photosensitive material, for example, polyvinyl alcohol and ammonium bichromate. A quantity of this suspension is provided on the screen whereafter a large part of the suspension (the suspension excess) is removed again. The material left on the screen has the shape of a thin layer which is dried and subsequently exposed by radiation having certain wavelengths through an apertured mask which is arranged in the vicinity of the screen. The apertures in the mask correspond to the phosphor elements to be formed. Under the influence of the radiation the photosensitive material is polymerized in the irradiated areas of the screen so that at these areas the polyvinyl alcohol becomes insoluble in water. Polymerisation is not effected in the non-exposed areas of the screen, so that the material can readily be removed from these areas by means of rinsing with water (so-called development) and the desired phosphor pattern remains on the screen. This method is repeated for the phosphors to be further provided while every time exposing from a different direction, so that the desired pattern of phosphor groups is formed.

In the above-described method only a small portion of the original phosphor material provided with the aid of a suspension is left on the screen. The manufacturing residues formed consisting of the suspension excess removed from the screen and the development residues removed by rinsing have a considerable value especially when a rare earth phosphor is concerned. These rare earth phosphors, for example, the known red luminescent europium or samarium-activated oxides, vanadates or oxysulphides of a rare earth metal are generally provided as the last material on the screen. As a result the manufacturing residues formed during the process of providing the rare earth phosphor not only contain polyvinyl alcohol and chromium compounds but also phosphor particles originating from previously provided phosphors elements as impurities. These previously provided phosphors generally consist of sulphides and/or selenides of zinc and/or cadmium, for example, blue luminescent silver-actiavted zinc sulphide and green luminescent silver-actiavted zinc cadmium sulphide.

Also when using methods other than the one described above for the manufacture of colour screens manufacturing residues are often obtained which contain the costly rare earth phosphors. The solid substances present in the manufacturing residues are generally first separated from the liquid, for example, by spinning or filtration, whereby a wet mixture is obtained which may be optionally dried. For a further effective use of the rare earth phosphors present in the mixture it is necessary to remove the impurities, particularly the traces of other phosphors, which influence the emission colours, as much as possible from these residues. A method of recovering a rare earth phosphor from screen manufacturing residues is known, for example, from U.S. Pat. Specification 3,474,040. In this known method the manufacturing residues are treated with a heated mineral acid, for example, $HNO_3$, $HCl$ or $H_2SO_4$. The sulphides and/or selenides present in the residues dissolve in the acid used and are subsequently removed by rinsing. A drawback of the known method is that a portion of the rare earth phosphor is also often dissolved and is consequently lost. In the case of a luminescent rare earth oxide and known method cannot be used at all because the rare earth oxide substantially dissolves in the acids used. Also the luminescent oxysulphides of rare earths present difficulties in this respect so that considerable losses may occur.

The object of the present invention is to provide an improved method of recovering rare earth phosphors from manufacturing residues in which the drawbacks of the known methods are largely obviated.

According to the invention a method of recovering a rare earth phosphor from a mixture containing the said phosphor and at least one sulphide and/or selenide of zinc and/or cadmium is characterized in that the mixture is treated in an aqueous alkaline solution which contains a hypohalogenite and whose pH is larger than 12, and that the rare earth phosphor is subsequently separated from the liquid and washed with water.

In a method according to the invention it is possible to start from a mixture which is dried or not dried and the sulphides and/or selenides present in the mixture are oxydized by the hypohalogenite used, for example, to form soluble sulphates and selenates and are subsequently completely removed by washing with water. A method according to the invention has the advantage that it is much more selective than the known method, that is to say, the rare earth phosphor is attacked to a much slighter extent so that a larger yield of the desired rare earth phosphor is possible. A further advantage of a method according to the invention is that the sulphides and selenides, particularly the very resistant zinc sulphides are better dissolved so that recovery may generally be effected within a shorter period. Furthermore an important advantage of a method according to the invention is that rare earth oxides can also be recovered.

The period of treatment with the aqueous solution in a method according to the invention may be varied within very wide limits, for example, from 1 minute to several hours. The duration is generally dependent on the quantity of contaminating sulphides and/or selecides, on the resistance of the sulphides and/or selenides which is also determined by crystal shape and crystal size, on the concentration of the hypohalogenite used, and on the pH of solution used and furthermore on the temperature of the solution. Generally recovery may be effected within a shorter period as the hypohalogenite concentration, the pH and the temperature are higher. The treatment with the aqueous solution may be effected at room temperature, so that the method according to the invention may be used easily in a cheap manner on a large scale. If desired, the temperature during treatment may, however, be increased, for example, up to the boiling point of the solution used, so that recovery is possible within a shorter period.

In a method according to the invention an alkaline solution is preferably used, which contains at least 4 gram mol of hypohalogenite per gram mol of sulphide and/or selenide present, so that a full reaction into sulphates and/or selenates is ensured.

A method according to the invention is preferred in which the aqueous solution contains in addition to hypohalogenite at least 1 gram mol of a strong base, for example, NaOH or KOH per litre because the reaction with the sulphides and/or selenides in a strong alkaline medium proceeds most smoothly.

For example, $Ca(ClO)_2$, $CaClOCl$, $NaBrO$, $KClO$ and $NaClO$ may be used as hypohalogenites. The last-mentioned compound is, however, preferred because it is most easily accessible. Furthermore, this compound is cheap and available in a pure form.

In a preferred embodiment of a method according to the invention the separated rare earth phosphor is rinsed with a diluted acid before it is washed with water so that washing with water is simplified. When recovering a rare earth oxide, rinsing with a diluted acid has the advantage that the film probably consisting of hydroxide formed in some cases on the oxide grains during the treatment with hypohalogenite is removed.

A method according to the invention may be advantageously used for recovering luminescent oxysulphides, vanadates and oxides of rare earth metals. The red luminescent phosphors which are most generally used in cathode-ray tubes for the display of coloured images belong to this group of phosphors.

It is to be noted that the greater part of the polyvinyl alcohol present in the phosphor residues is soluble so that it is removed during the washing operation. Traces of chromium compounds which are often still present are also dissolved during the treatment. Furthermore, it is to be noted that phosphor mixtures originating from screen failures and from cathode-ray tubes rejected during the manufacture of the tubes may alternatively be treated by a method according to the invention.

In order that the invention may be readily carried into effect, it will now be described by way of several Examples.

EXAMPLE 1.

15 gms of a phosphor mixture consisting of red luminescent $Y_{1.9}Eu_{0.1}O_2S$ green luminescent (Zn,Cd)S (ZnS 58%, CdS 42%, $Ag^{10-2}$% by weight) and blue luminescent ZnS,(Ag $10^{-2}$% by weight), which mixture contained 9.1 % by weight of ZnS and 0.16% by weight of CdS, were stirred for 30 minutes at a temperature of 90°C in 200 mls of an aqueous 4N NaOH solution which furthermore contained such a quantity of NaClO as corresponds to 10 gms of active chlorine.

The phosphor was subsequently filtered off and washed with an aqueous $0.1N$ $HNO_3$ solution at a temperature of approximately 25°C. Finally the phosphor was rinsed electrolyte-free with water and dried.

The $Y_2O_2S$-Eu obtained contained less than 0.01% by weight of sulphides and had a luminance upon excitation by electrons which was the same as that of the original pure oxysulphide. The quantity of oxysulphide obtained was 98.8% by weight calculated on the original quantity.

EXAMPLE 2.

15 gms of a phosphor mixture consisting of $Y_2O_2S$-Eu, ZnS and (Zn, Cd)S which contained 0.45% by weight of ZnS and 0.08% by weight of CdS was stirred for 60 minutes at a temperature of 20°C on 200 mls of an aqueous 5N NaOH solution. Before adding the phosphor mixture, mixture, 2 gms of bromine were added to this solution, so that NaBrO was formed as an oxydizing compound.

Subsequently the phosphor was filtered off and washed with water and dried. The luminescent oxysulphide obtained contained less than 0.01 % by weight of sulphides and had a luminance upon electron excitation which was equal to that of the original pure oxysulphide. The quantity obtained was in this case 97.5 % by weight.

EXAMPLE 3.

15 gms of a phosphor mixture consisting of $YVO_4$-Eu, ZnS and (Zn, Cd)S which contained 2% by weight of ZnS and 0.3 % by weight of CdS were stirred for 2 hours at a temperature of 50°C in 200 mls of an aqueous 4N NaOH solution which also contained 2 gms of $Ca(ClO)_2$.

The phosphor was subsequently filtered off and washed in an aqueous $0.5N$ $HNO_3$ solution at a temperature of 25°C. Finally the phosphor was rinsed electrolyte-free with water and dried.

The luminescent yttrium vanadate obtained contained less than 0.02 % by weight of sulphides. It was found that the luminance upon electron excitation has not decreased as compared with the original $YVO_4$. The quantity obtained by this treatment was 99.2 % by weight.

EXAMPLE 4.

1,000 gms of a phosphor mixture consisting of $Y_2O_3$-Eu, ZnS and (Zn, Cd)S which contained 2.3 % by weight of ZnS and 0.4 % by weight of CdS were stirred for 30 minutes at a temperature of 50 °C in 2000 mls of an aqueous 2N NaOH solution which also contained such a quanitty of NaClO as corresponds to 135 gms of active chlorine.

The phoshor was subsequently filtered off and stirred for 20 minutes at a temperature of 25 °C in 200 mls of an aqueous 1N $HNO_3$ solution. Subsequently, the phosphor was rinsed electrolyte-free with water and dried.

The luminescent yttrium oxide obtained contained less than 0.01 % by weight of sulphides. The quantity obtained by this treatment was 98.0 % by weight.

EXAMPLE 5.

15 gms of a phosphor mixture consisting of $La_2O_2S$-Eu, ZnS and (Zn, Cd)S which contained 6.0 % by weight of ZnS and 0.6 % by weight of CdS were stirred for 30 minutes at a temperature of 25°C in 100 mls of an aqueous 2.5N NaOH solution which also contained such a quantity of NaClO as corresponds to 5 gms of active chlorine.

After filtering off, the phosphor was rinsed for 10 minutes in 200 mls of an aqueous 2N acetic acid solution at a temperature of 25°C. Subsequently the phosphor was washed with water and dried.

The luminescent lanthanum oxysulphide obtained contained less than 0.02 % by weight of sulphides. The quantity obtained by this treatment was 97.9 % by weight.

EXAMPLE 6.

15 gms of a phosphor mixture consisting of a $Gd_2O_3$-Eu, ZnS and (Zn, Cd)S which contained 0.45 % by weight of ZnS and 0.08 % by weight of CdS were stirred for 30 minutes at a temperature of 50°C in 100 mls of an aqueous 2N NaOH solution which also contained such a quantity of NaClO as corresponds to 10 gms of active chlorine.

After filtering off, the phosphor was rinsed for 10 minutes at a temperature of 25°C in 200 mls of an aqueous 2N acetic acid solution. Subsequently the phosphor was rinsed electrolyte-free with water and dried.

The luminescent gadolinium oxide obtained contained less than 0.01 % by weight of sulphides, and had a luminance upon electron excitation which was equal to that of the original pure oxide. The quantity obtained by this treatment was 98.0 % by weight.

What is claimed is:

1. A method of recovering a rare earth phosphor selected from the group consisting of rare earth oxides, oxysulfides and vanadates from a mixture containing said phosphor and at least one sulfide or selenide of zinc or cadmium comprising treating said mixture with an aqueous alkaline hypobromite or hyphchlorite solution having a pH in excess of 12 for a time sufficient to substantially completely effect the conversion of the sulfides and selenides to soluble sulfates and selenates, separating the rare earth phosphor from the solution and washing the separated rare earth phosphor with water.

2. A method as claimed in claim 1 wherein the alkaline solution contains at least 4 gram mol of hypobromite or hypochlorite per gram mol of sulfide and/or selenide present.

3. A method as claimed in claim 2, wherein the aqueous solution contains at least 1 gram mol of NaPH or KOH per litre.

4. A method as claimed in claim 2 wherein NaClO is used as the hypochlorite.

5. A method as claimed in claim 2, wherein the separated rare earth phosphor is rinsed with dilute acid before it is washed with water.

* * * * *

PO-1050
(5/69)

UNITED STATES PATENT OFFICE
CERTIFICATE OF CORRECTION

Patent No. 3,763,050                    Dated   October 2, 1973

Inventor(s)  JOHANNES ALOYSIUS MARIA DIKHOFF ET AL

It is certified that error appears in the above-identified patent and that said Letters Patent are hereby corrected as shown below:

Column 3, line 23, "102" should be cancelled.

Column 6, line 8, "hyphchlorite" should be -- hypochlorite --.

Signed and sealed this 9th day of April 1974.

(SEAL)
Attest:

EDWARD M. FLETCHER, JR.
Attesting Officer

C. MARSHALL DANN
Commissioner of Patents